US012498649B2

(12) United States Patent
Nagatoshi

(10) Patent No.: US 12,498,649 B2
(45) Date of Patent: Dec. 16, 2025

(54) IMAGE FORMING APPARATUS WITH LASER SCANNING COMPONENTS POSITIONED FOR ENHANCED COMPACTNESS

(71) Applicant: CANON KABUSHIKI KAISHA, Tokyo (JP)

(72) Inventor: Jun Nagatoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/496,765

(22) Filed: Oct. 27, 2023

(65) Prior Publication Data

US 2024/0061358 A1 Feb. 22, 2024

Related U.S. Application Data

(62) Division of application No. 18/077,859, filed on Dec. 8, 2022, now Pat. No. 11,835,882, which is a division (Continued)

(30) Foreign Application Priority Data

Oct. 1, 2018 (JP) ................................ 2018-186516

(51) Int. Cl.
*G03G 15/04* (2006.01)
*G02B 26/12* (2006.01)
(Continued)

(52) U.S. Cl.
CPC ......... *G03G 15/0435* (2013.01); *G02B 26/12* (2013.01); *G03G 15/0194* (2013.01);
(Continued)

(58) Field of Classification Search
CPC ........... G03G 15/0435; G03G 15/2064; G03G 15/04072; G03G 15/0194; G03G 15/6552;
(Continued)

(56) References Cited

U.S. PATENT DOCUMENTS 5,818,506 A 10/1998 Yamaguchi et al. ......................... G02B 27/1073
9,128,291 B2 9/2015 Nagatoshi et al. .. G03G 15/043
(Continued)

FOREIGN PATENT DOCUMENTS

CN 2814442 Y 9/2006
JP H08-22175 A 1/1996
(Continued)

OTHER PUBLICATIONS

Office Action dated May 23, 2022 in counterpart Chinese Application No. 201910920493.3, together with English translation thereof.

(Continued)

*Primary Examiner* — Stephanie E Bloss
*Assistant Examiner* — Laura Roth
(74) *Attorney, Agent, or Firm* — Venable LLP

(57) ABSTRACT

An image forming apparatus includes a plurality of photosensitive members; a scanner unit including light sources, a rotatable polygonal mirror, and reflecting members; and a fixing portion. Parts of the laser beams emitted from the light sources are reflected by the rotatable polygonal mirror toward the fixing device side, and rest parts of the laser beams are reflected by the rotatable polygonal mirror toward a side opposite from the fixing device side. Of the parts of the laser beams reflected by the rotatable polygonal mirror toward the fixing device side, the laser beam reflected toward the reflecting member provided at a position remotest from the rotatable polygonal mirror travels downward relative to a horizontal direction. A rotational axis of the rotatable polygonal mirror is inclined relative to a vertical direction.

3 Claims, 8 Drawing Sheets

Related U.S. Application Data of application No. 17/122,742, filed on Dec. 15, 2020, now Pat. No. 11,556,076, which is a division of application No. 16/575,651, filed on Sep. 19, 2019, now Pat. No. 10,895,821.

(51) Int. Cl.

| | |
|---|---|
| ***G03G 15/00*** | (2006.01) |
| ***G03G 15/01*** | (2006.01) |
| ***G03G 15/043*** | (2006.01) |
| ***G03G 15/20*** | (2006.01) |

(52) U.S. Cl.

CPC . *G03G 15/04036* (2013.01); *G03G 15/04072* (2013.01); *G03G 15/2064* (2013.01); *G03G 15/6552* (2013.01); *G03G 2215/00421* (2013.01); *G03G 2215/0103* (2013.01); *G03G 2215/0404* (2013.01)

(58) Field of Classification Search

CPC . G03G 2215/00421; G03G 2215/0103; G03G 15/04036; G03G 2215/0404; G02B 26/12; G02B 26/125

See application file for complete search history.

(56) References Cited

U.S. PATENT DOCUMENTS

| | | | | |
|---|---|---|---|---|
| 9,581,929 | B2 | 2/2017 | Nagatoshi et al. | G03G 15/043 |
| 9,854,120 | B2 | 12/2017 | Tanaka et al. | H04N 1/113 |
| 11,709,437 | B2 | 7/2023 | Murotani et al. | G03G 15/0409 |
| 2002/0080219 | A1 | 6/2002 | Yamaguchi et al. | 347/115 |
| 2006/0017996 | A1 | 1/2006 | Tamaru | 359/204.1 |
| 2006/0290773 | A1 | 12/2006 | Fukutomi | 347/238 |
| 2007/0165097 | A1 | 7/2007 | Kato et al. | |
| 2007/0248387 | A1 | 10/2007 | Iwamoto | 399/299 |
| 2008/0094678 | A1 | 4/2008 | Uduki | 359/204.1 |
| 2008/0225102 | A1 | 9/2008 | Tomita | 347/129 |
| 2009/0175656 | A1 | 7/2009 | Kim et al. | 399/221 |
| 2011/0058230 | A1 | 3/2011 | Soeda et al. | 358/474 |
| 2011/0316960 | A1 | 12/2011 | Igarashi et al. | 347/224 |
| 2012/0177409 | A1 | 7/2012 | Arai et al. | 399/177 |
| 2013/0070041 | A1* | 3/2013 | Hudson | B41J 2/473<br>347/242 |
| 2013/0076852 | A1 | 3/2013 | Bai et al. | 347/261 |
| 2014/0118808 | A1 | 5/2014 | Park | 359/197.1 |
| 2015/0241838 | A1 | 8/2015 | Ishida et al. | 399/91 |
| 2015/0346487 | A1 | 12/2015 | Miyatake et al. | 359/204.1 |
| 2018/0288263 | A1 | 10/2018 | Kusuda | |

FOREIGN PATENT DOCUMENTS

| | | |
|---|---|---|
| JP | 2001-264655 A | 9/2001 |
| JP | 2002-244396 | 8/2002 |
| JP | 2004-177512 | 6/2004 |
| JP | 2005-091966 | 4/2005 |
| JP | 2006-030912 | 2/2006 |
| JP | 2007-292972 | 11/2007 |
| JP | 2010-181481 | 8/2010 |
| JP | 2010-204494 | 9/2010 |
| JP | 2011-112705 | 6/2011 |
| JP | 2012-013754 | 1/2012 |
| JP | 2012-048079 | 3/2012 |
| JP | 2015-052727 | 3/2015 |
| JP | 2015-225139 | 12/2015 |

OTHER PUBLICATIONS

Office Action dated Aug. 2, 2022 in counterpart Japanese Application No. 2018-186516, together with English translation thereof.

Office Action dated Oct. 25, 2022 in counterpart Japanese Application No. 2018-186516, together with English translation thereof.

Office Action dated Oct. 26, 2024 in counterpart Chinese Application No. 202211655950.9, together with English translation thereof.

* cited by examiner

IMAGE FORMING APPARATUS WITH LASER SCANNING COMPONENTS POSITIONED FOR ENHANCED COMPACTNESS

This application is a division of application Ser. No. 18/077,859 filed Dec. 8, 2022, currently pending, which was a division of application Ser. No. 17/122,742 filed Dec. 15, 2020 and issued as U.S. Pat. No. 11,556,076 on Jan. 17, 2023, which was a division of application Ser. No. 16/575,651 filed Sep. 19, 2019 and issued as U.S. Pat. No. 10,895,821 on Jan. 19, 2021; and claims priority under 35 U.S.C. § 119 to Japan Application No. 2018-186516 filed on Oct. 1, 2018; and the contents of all of which are incorporated herein by reference as if set forth in full.

FIELD OF THE INVENTION AND RELATED ART

The present invention relates to an image forming apparatus, such as a copying machine or a laser beam printer, using electrophotography.

As the image forming apparatus using electrophotography, an image forming apparatus in which photosensitive members and developing devices which correspond to four colors of yellow (Y), magenta (M), cyan (C) and black (K) are arranged substantially in a straight line has been known. An image forming apparatus disclosed in Japanese Laid-Open Patent Application (JP-A) 2011-112705 is provided with cartridges 151Y, 151M, 151C and 151K for the associated colors of Y, M, C and K, respectively, each in which the photosensitive member and the developing device are integrally assembled into a unit as shown in FIG. 5. Above these cartridges 151Y, 151M, 151C and 151K, a single optical scanning apparatus 152 for irradiating the respective photosensitive members with light beams is provided. A recording material passed through a fixing device 155 as an image heating portion is discharged onto a stacking tray 156.

Further, in an image forming apparatus shown in FIG. 8, an optical scanning apparatus 152 is constituted in the following manner. The optical scanning apparatus 152 deflects a light beam from a light source by a single deflector 153, so that photosensitive members of cartridges 151Y, 151M, 151C and 151K are scanned with light beams through a plurality of deflecting (reflecting) mirrors 154Y, 154M, 154C and 154K. Further, in the image forming apparatus, a stacking tray 156 for staking a recording material which passes through a fixing device 155 as the image heating portion and which is to be discharged thereon is provided above the optical scanning apparatus 152.

An image forming apparatus disclosed in JP-A 2005-91966 is provided with a single optical scanning apparatus 162 for irradiating a plurality photosensitive members 161Y, 161M, 161C and 161K which are juxtaposed, with light beams are provided below the photosensitive members as shown in FIG. 6. The optical scanning apparatus 162 deflects a light beam from a light source by a single reflector 163, so that the photosensitive members 161Y, 161M, 161C and 161K are scanned with light beams through a plurality of deflecting mirrors 164Y, 164M, 164C and 164K. Further, in the image forming apparatus, a stacking tray 166 for staking a recording material which passes through a fixing device 165 as the image heating portion and which is to be discharged thereon is provided at an upper portion of the image forming apparatus.

An image forming apparatus disclosed in JP-A 2006-30912 is provided with a single optical scanning apparatus 172 for irradiating a plurality photosensitive members 171Y, 171M, 171C and 171K which are juxtaposed, with light beams are provided above the photosensitive members as shown in FIG. 7. The optical scanning apparatus 172 deflects a light beam from a light source by a single reflector 173, so that the photosensitive members 171Y, 171M, 171C and 171K are scanned with light beams through a plurality of deflecting mirrors 174Y, 174M, 174C and 174K. Further, in the image forming apparatus, a stacking tray 176 for staking a recording material which passes through a fixing device 175 as the image heating portion and which is to be discharged thereon is provided above the optical scanning apparatus 172.

However, in the above-described image forming apparatuses disclosed in JP-A 2011-112705, JP-A 2005-91966 and JP-A 2006-30912, for convenience of the optical scanning apparatuses, there arose a problem such that a height of a main assembly of the image forming apparatus becomes large.

Particularly, the optical scanning apparatuses of the types of JP-A 2011-112705 and JP-A 2006-30912 are required that the deflecting (reflecting) mirror is disposed above the photosensitive member for the color (yellow in JP-A 2011-112705) closest to the fixing device as the image heating portion. In that case, when the stacking tray having an inclined surface such that a level on the image heating portion side is low is disposed so as to avoid the deflecting mirror, the height of the main assembly of the image forming apparatus has to be increased.

Therefore, a principal object of the present invention is to provide an image forming apparatus in which an inside space thereof is effectively utilized.

SUMMARY OF THE INVENTION

According to an aspect of the present invention, there is provided an image forming apparatus comprising: a plurality of photosensitive members; a scanner unit configured to scan the photosensitive members with laser beams in accordance with image information, wherein the scanner unit includes light sources corresponding to the photosensitive members, respectively, a rotatable polygonal mirror configured to reflect and deflect the laser beams emitted from the light sources, and a plurality of reflecting members configured to reflect the laser beams, respectively, reflected by the rotatable polygonal mirror; and a fixing portion configured to fix, on a recording material, toner images formed on the photosensitive members and then superposed on the recording material, wherein parts of the laser beams emitted from the light sources are reflected by the rotatable polygonal mirror toward a side where the fixing device is provided, and rest parts of the laser beams are reflected by the rotatable polygonal mirror toward a side opposite from the side where the fixing device is provided, wherein of the parts of the laser beams reflected by the rotatable polygonal mirror toward the side where the fixing device is provided, the laser beam reflected toward the reflecting member provided at a position remotest from the rotatable polygonal mirror travels downward relative to a horizontal direction, and wherein a rotational axis of the rotatable polygonal mirror is inclined relative to a vertical direction.

According to another aspect of the present invention, there is provided an image forming apparatus comprising: a plurality of photosensitive members; a scanner unit configured to scan the photosensitive members with laser beams in accordance with image information, wherein the scanner unit includes light sources corresponding to the photosensitive members, respectively, a rotatable polygonal mirror configured to reflect and deflect the laser beams emitted from the light sources, and a plurality of reflecting members configured to reflect the laser beams, respectively, reflected by the rotatable polygonal mirror; and a fixing portion configured to fix, on a recording material, toner images formed on the photosensitive members and then superposed on the recording material, wherein parts of the laser beams emitted from the light sources are reflected by the rotatable polygonal mirror toward a side where the fixing device is provided, and rest part of the laser beams are reflected by the rotatable polygonal mirror toward a side opposite from the side where the fixing device is provided, wherein of the parts of the laser beams reflected by the rotatable polygonal mirror toward the side where the fixing device is provided, the laser beam reflected toward the reflecting member provided at a position remotest from the rotatable polygonal mirror travels downward relative to an arrangement direction of the photosensitive members, and wherein a rotational axis of the rotatable polygonal mirror is inclined relative to a direction perpendicular to the arrangement direction of the photosensitive members.

Further features of the present invention will become apparent from the following description of exemplary embodiments with reference to the attached drawings.

DESCRIPTION OF EMBODIMENTS

Embodiments of the present invention will be specifically described with reference to the drawings. Dimensions, materials, shapes and relative arrangements of constituent elements described in the following embodiments should be appropriately be changed depending on structures and various conditions of apparatuses to which the present invention is applied. Accordingly, the scope of the present invention is not intended to be limited to the following embodiments unless otherwise specified.

Embodiment 1

(Image Forming Apparatus)

Figure 1:
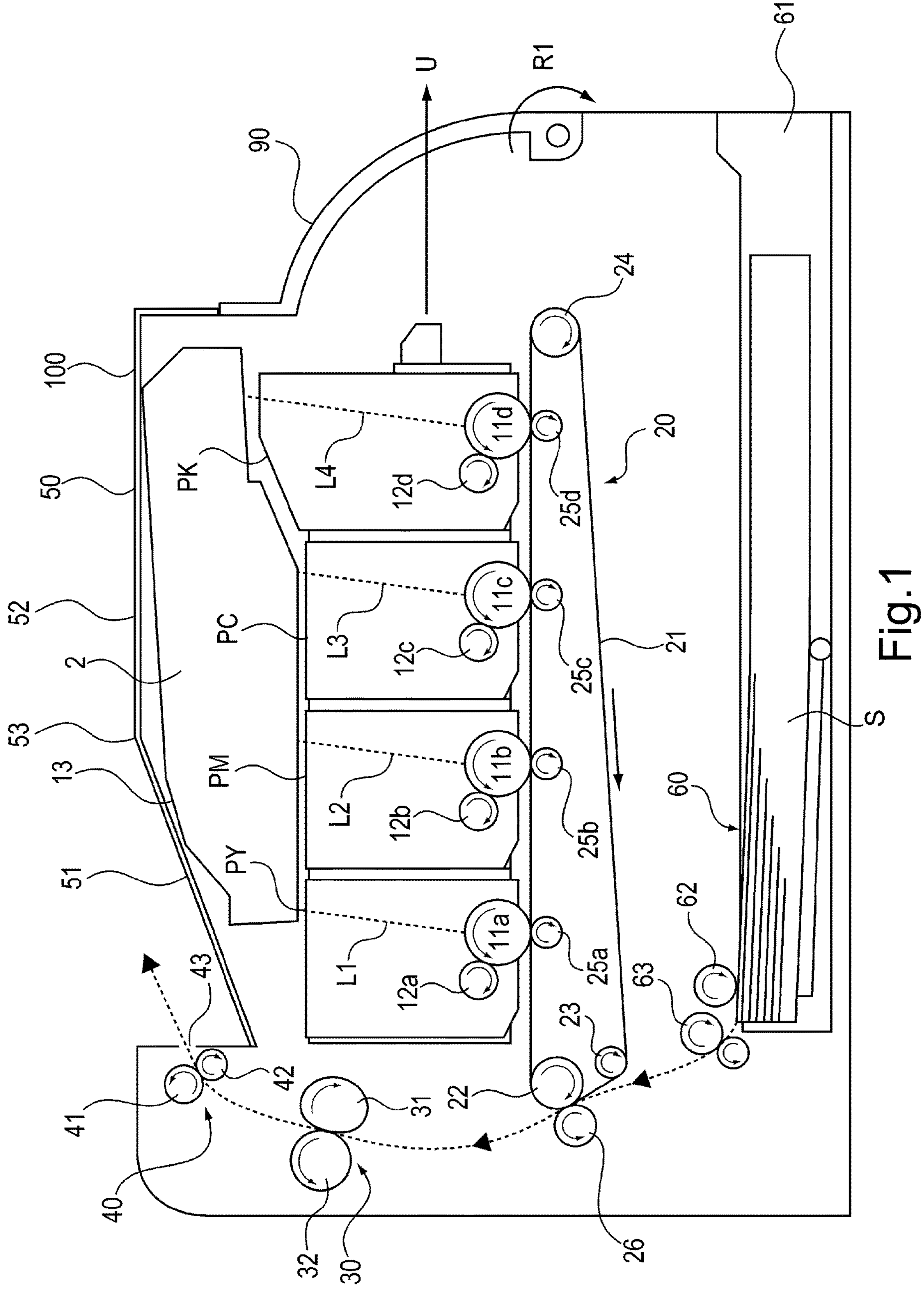
FIG. 1 is a sectional view showing an image forming apparatus according to an embodiment 1.

With reference to FIG. 1, an image forming apparatus according to an embodiment 1 will be described. FIG. 1 is a sectional view showing a laser beam printer which is an image forming apparatus 100 of this embodiment. In the following, a general structure and function of this laser beam printer will be described. In the following description, as regards the image forming apparatus 100, a front side is a side where a process cartridge PK is provided. A rear side is a side where a process cartridge PY is provided. A front-rear direction includes a direction (frontward direction) from the rear side toward the front side of the image forming apparatus and a direction (rearward direction) opposite to the frontward direction.

Inside the image forming apparatus 100, from the front side toward the rear side, first to fourth (four) portions PY, PM, PC and PK are arranged and disposed substantially in the horizontal direction (inline constitution), tandem type). The four process cartridges in this embodiment has a constitution in which the process cartridges corresponding to four colors of yellow (Y), magenta (M), cyan (C) and black (K) in a named order from the rear side toward the front side. Each of the process cartridges in this embodiment is prepared by integrally assembling a photosensitive drum 11 as a photosensitive member (image bearing member) and a developing roller 12 or the like as a process means actable on this drum into a unit. Further, each process cartridge also functions as a cartridge for accommodating toner. Of the four process cartridges, the color of the toner accommodated in the process cartridge PK disposed at a position remotest from a fixing device 30 which is an image heating portion is black. Of the four process cartridges, the process cartridge PK corresponding to black disposed on the forefront side is larger in toner volume than the process cartridges PY, PM and PC corresponding to other three colors.

Incidentally, here, as the cartridge, the process cartridge integrally including the photosensitive member, the process means actable on the photosensitive member, and a cartridge accommodating the toner was described as an example, but the present invention is not limited thereto. For example, a constitution in which the cartridge accommodating the toner is provided separately from a process cartridge integrally including the photosensitive member and the process means actable on the photosensitive member may also be employed.

Above these process cartridges PY, PM, PC and PK, an optical scanning apparatus 2 as an optical scanning portion is provided. This optical scanning apparatus 2 scans a surface (surface-to-be-scanned) of the photosensitive drum of each process cartridge with a light beam, so that an electrostatic latent image is formed. In each process cartridge, the electrostatic latent image formed on the photosensitive drum is developed by the developing roller 12, so that a toner image is formed on the photosensitive drum.

Under the process cartridges PY, PM, PC and PK, an intermediary transfer belt unit 20 is provided. The intermediary transfer belt unit 20 includes an intermediary transfer belt 21 which is an endless belt, and a plurality of stretching rollers consisting of a driving roller 22, a tension roller 23 and a follower roller 24. The intermediary transfer belt 21 is stretched by the driving roller 22, the tension roller 23 and the follower roller 24, and is rotated in an arrow direction in FIG. 1. The photosensitive drums 11 of the process cartridges contact an upper surface of the intermediary transfer belt 21. Inside the intermediary transfer belt 21, four primary transfer rollers 25 are provided opposed to the photosensitive drums 11 of the process cartridges. The primary transfer rollers 25 (25*a*, 25*b*, 25*c*, 25*d*) successively transfer superposedly the toner images from the opposing photosensitive drums 11 (11*a*, 11*b*, 11*c*, 11*d*) onto the intermediary transfer belt 21. Toward the driving roller 22, a secondary transfer roller 26 is contacted to the intermediary transfer roller 21.

The secondary transfer roller 26 collectively transfers the toner images from the intermediary transfer belt 21 onto the recording material.

At an upper portion of an inside of the image forming apparatus on the rear side, the fixing device 30 which is an image heating portion for heating the image formed on the recording material and a discharging device 40 which is a discharging portion are provided. At an upper surface of the image forming apparatus, a stacking tray 50 for stacking the recording materials on which the images are formed is provided. As the fixing device 30, a fixing device including a fixing film 31 and a pressing roller 32 is used. The discharging device 40 includes discharging rollers 41 and 42 and discharges, toward the stacking tray 50, the recording material passed through the fixing device 30. The stacking tray 50 is disposed above the optical scanning apparatus 2.

Sheets S which are the recording materials stacked in a feeding tray 61 of a feeding device 60 are fed by a feeding roller 62 rotating in an arrow direction in FIG. 1, and multi-fed sheets are separated and fed by a separate roller 63. Then, the sheet S is sent to a nip between the driving roller 22 and the secondary transfer roller 26, and the toner images formed on the intermediary transfer belt 21 are transferred onto the sheet S sent to the nip between the driving roller 22 and the secondary transfer roller 26. Further, the sheet S on which the toner images are transferred is sent to a nip between the fixing film 31 and the pressing roller 32 and is heated and pressed in the nip, so that the toner images are fixed on the sheet S. The sheet S on which the toner images are fixed is discharged onto the discharge tray 50 by the discharging rollers 41 and 42.

Here, in the image forming apparatus, the process cartridges PY, PM, PC and PK are arranged substantially in a line, but for the reason such that the process cartridge PK for black of the four colors is also used in monochromatic printing or the like, a user amount of the black toner is larger than those of other toners of the three colors. Therefore, in order to realize downsizing of the image forming apparatus while reducing an exchange frequency of the process cartridge, it is affective to make only a black toner volume larger than other color toner volumes.

The exchange of the process cartridge is made by opening a front cover 90 through rotation motion of the front cover 90 as shown by an arrow R1 and then by pulling out the process cartridge toward the front side of a main assembly of the image forming apparatus (in an arrow U direction). Therefore, the process cartridge PK larger in volume and height than other process cartridges can effectively utilize an inside space and can downsize the image forming apparatus when the process cartridge PK is in a forefront side of the main assembly (when being pulled out).

Further, the stacking tray 50 is disposed at the upper portion of the optical scanning apparatus 2 as described above. The stacking tray 50 is inclined downward toward the fixing device 30 relative to a horizontal surface in order to improve a positioning and orientation property of discharged sheets. The optical scanning apparatus 2 is obliquely disposed in a direction in which a rear-side upper portion 13 of the optical scanning apparatus 2 extends along inclination (inclined surface 51) of the stacking tray 50. By disposing the stacking tray 50 in this manner, the inside space of the image forming apparatus on a side below the stacking tray 50 is effectively utilized, so that the height of the image forming apparatus can be suppressed to a low level.

Further, the stacking tray 50 disposed above the optical scanning apparatus 2 is formed in the following shape.

Figure 2:
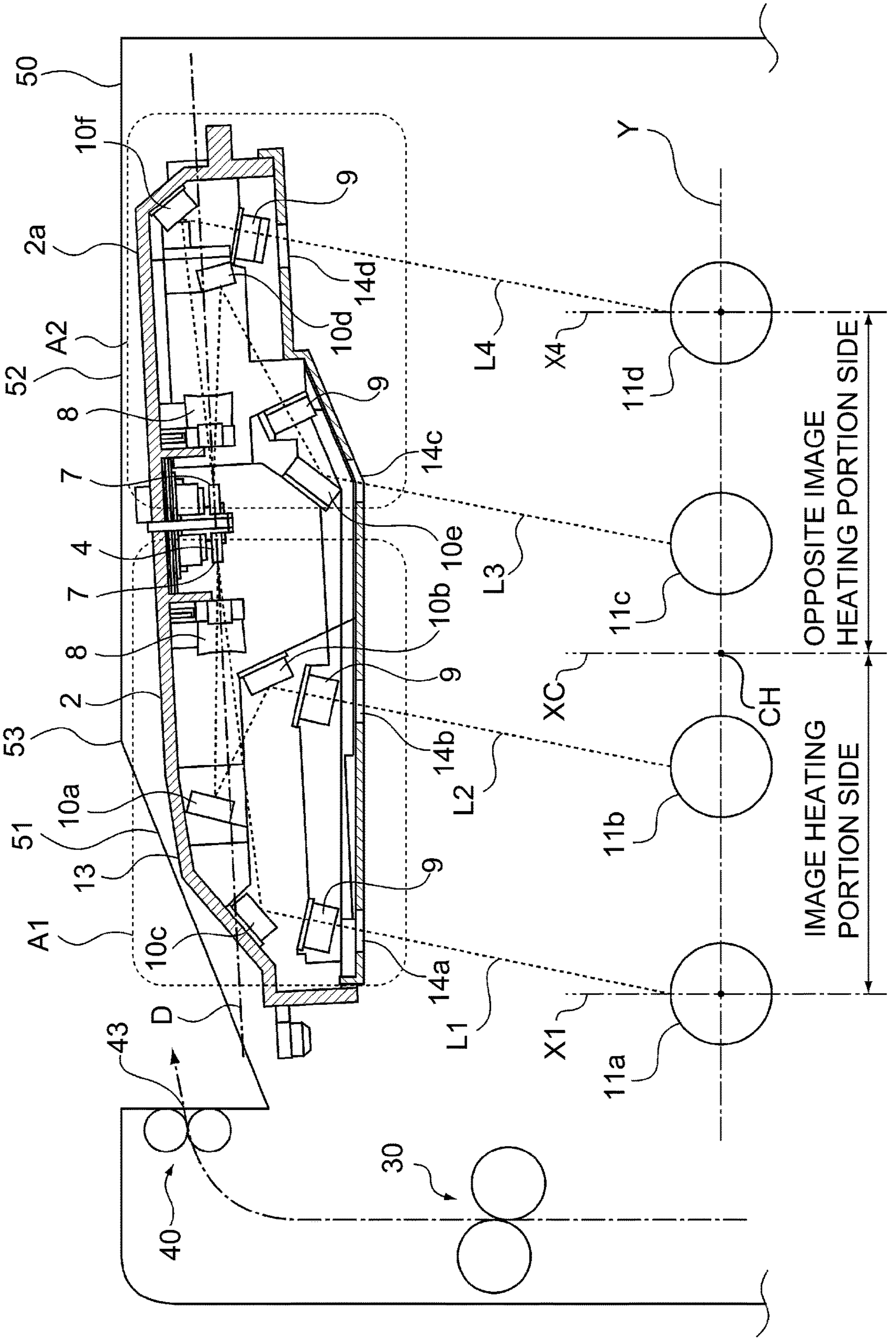
FIG. 2 is a sectional view of an optical scanning apparatus according to the embodiment 1.

The stacking tray 50 has the inclined surface 51 inclined downwardly toward the fixing device 30 from between a reflection mirror 10c which is a first reflecting member and a polygonal mirror 4 which is a rotatable polygonal mirror, which are included in the optical scanning apparatus 2 as shown in FIG. 2. The stacking tray 50 has a flat surface 52 extending in a horizontal direction from between the reflection mirror 10c (first reflecting member) and the polygonal mirror 4 (rotatable polygonal mirror) toward a side remote from the fixing device 30. The inclined surface 51 has a constitution in which the recording material slides (moves) toward the discharging roller side in order to establish positioning and orientation among the discharged recording materials and to stack the recording materials on the stacking tray 50 and in which end portions of the recording materials are thus positioned and oriented by a wall of the image forming apparatus. Incidentally, in this embodiment, the flat surface 52 of the stacking tray 50 is provided on the front side of the image forming apparatus, but the present invention is not limited thereto and the surface of the stacking tray 50 on the front side may also be a moderately curved surface.

Figure 4:
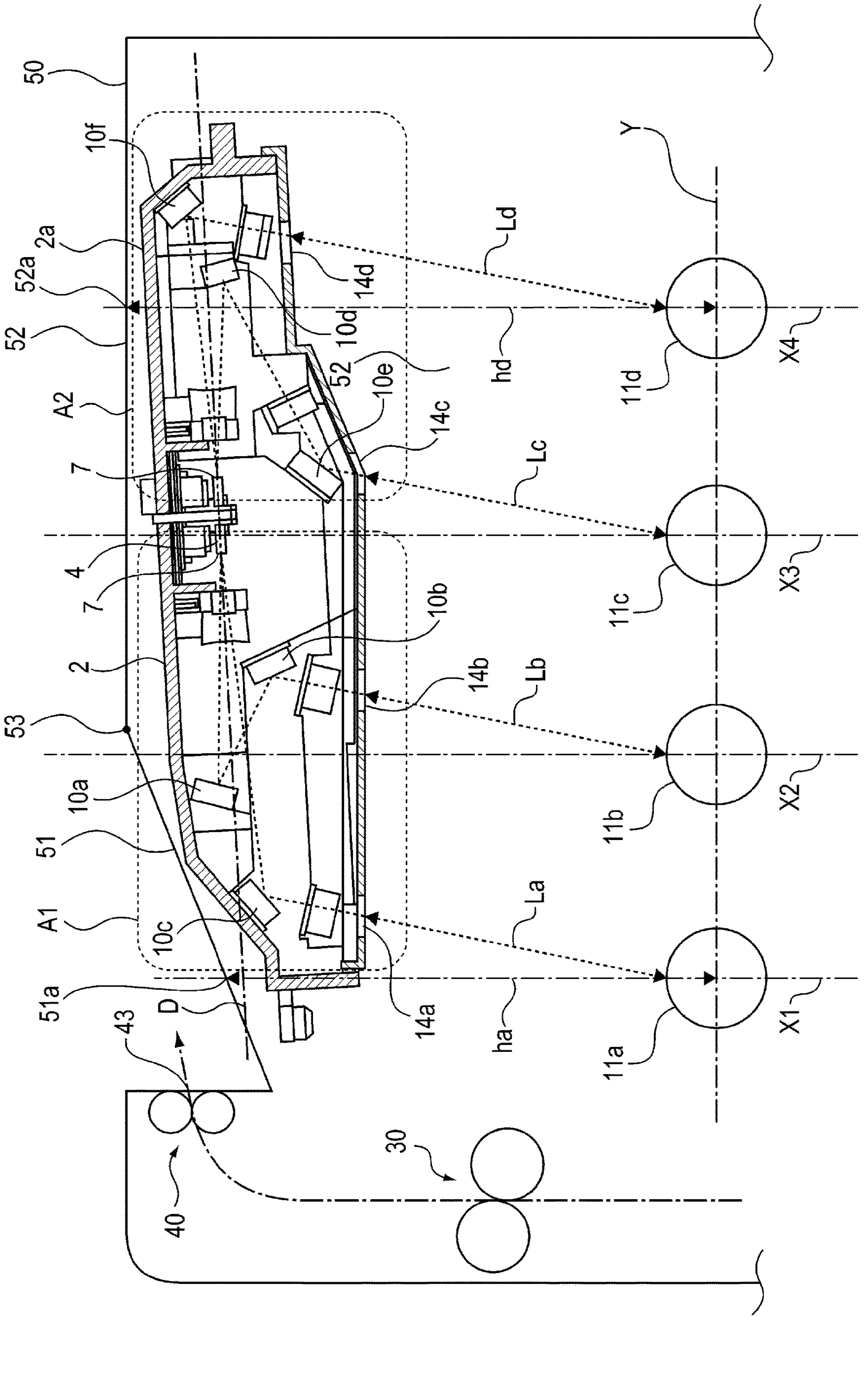
FIG. 4 is a schematic sectional view of the optical scanning apparatus according to the embodiment 1.
Figure 5:
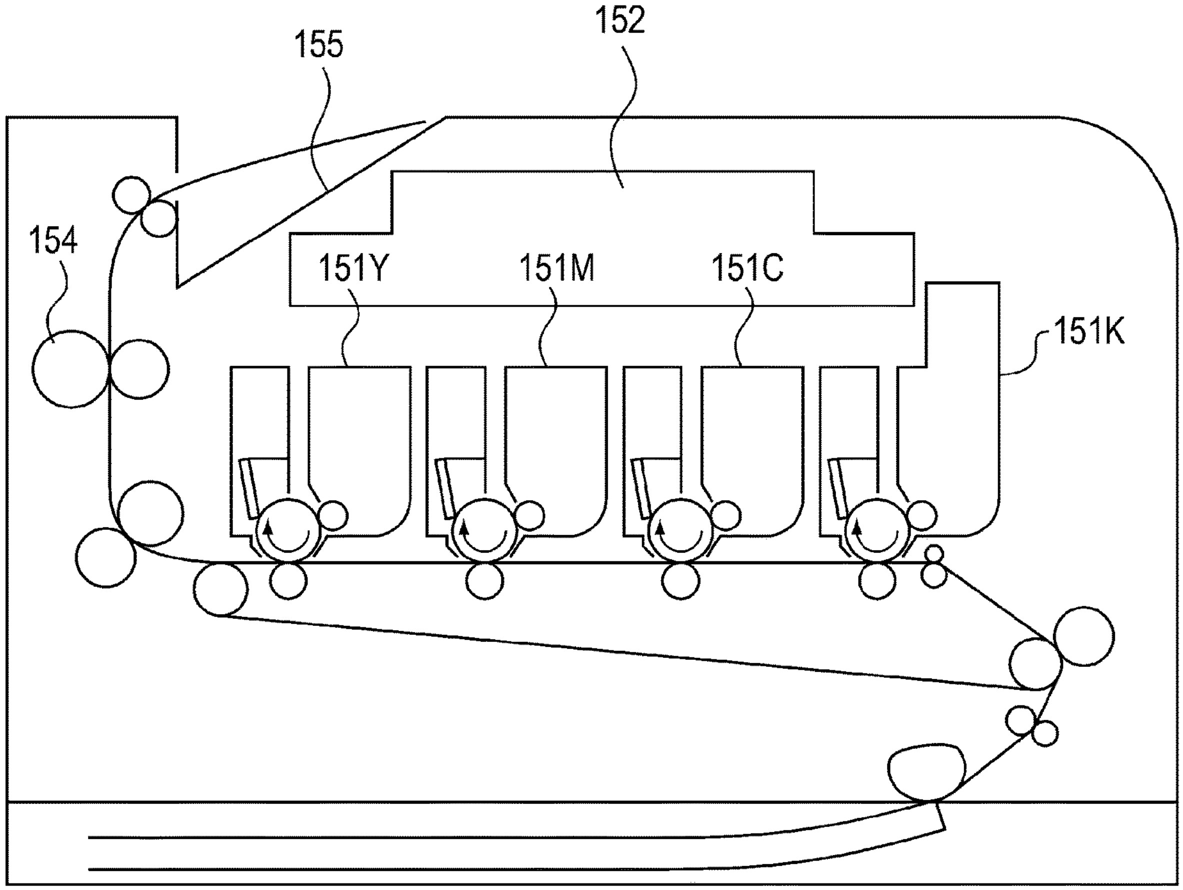
FIG. 5 is a sectional view for illustrating a conventional image forming apparatus.
Figure 6:
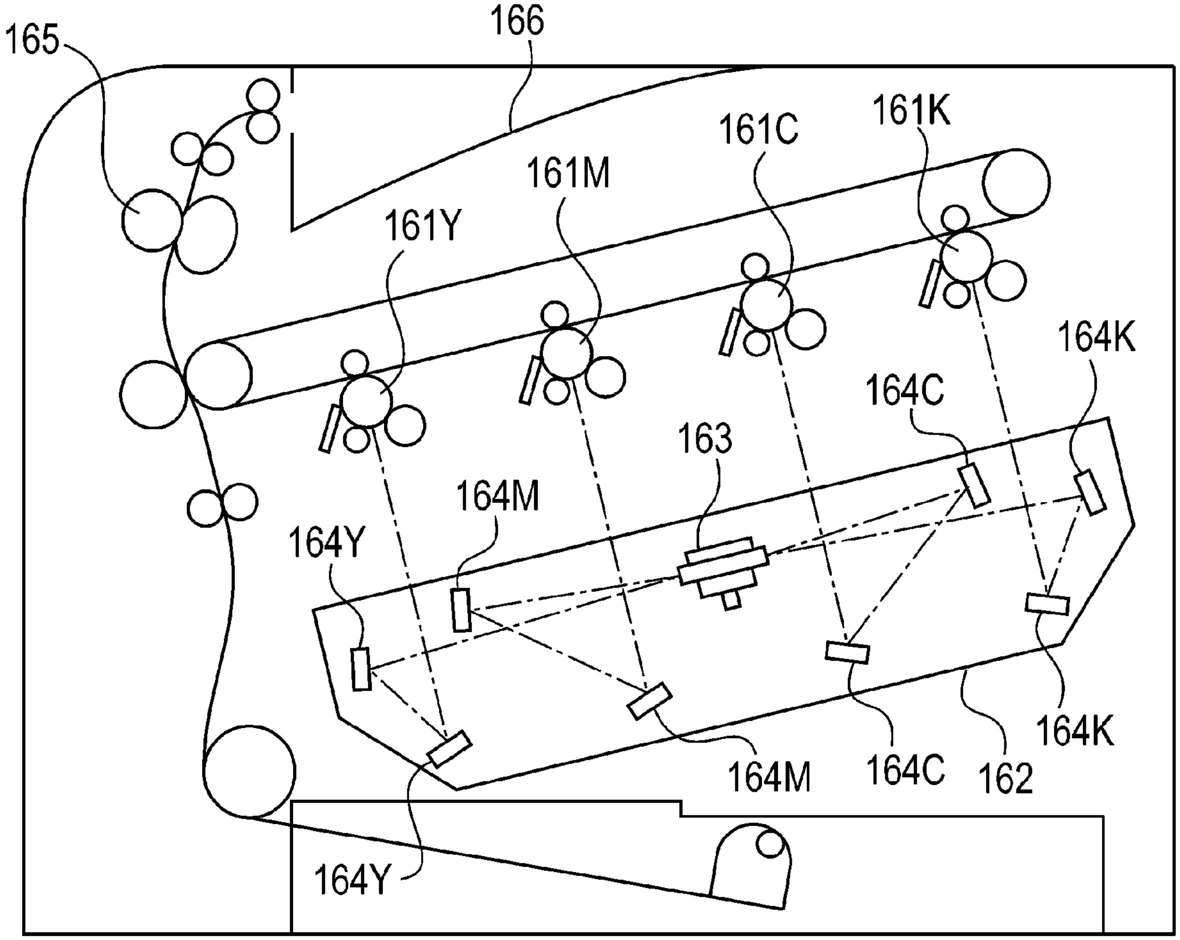
FIG. 6 is a sectional view for illustrating a conventional image forming apparatus.
Figure 7:
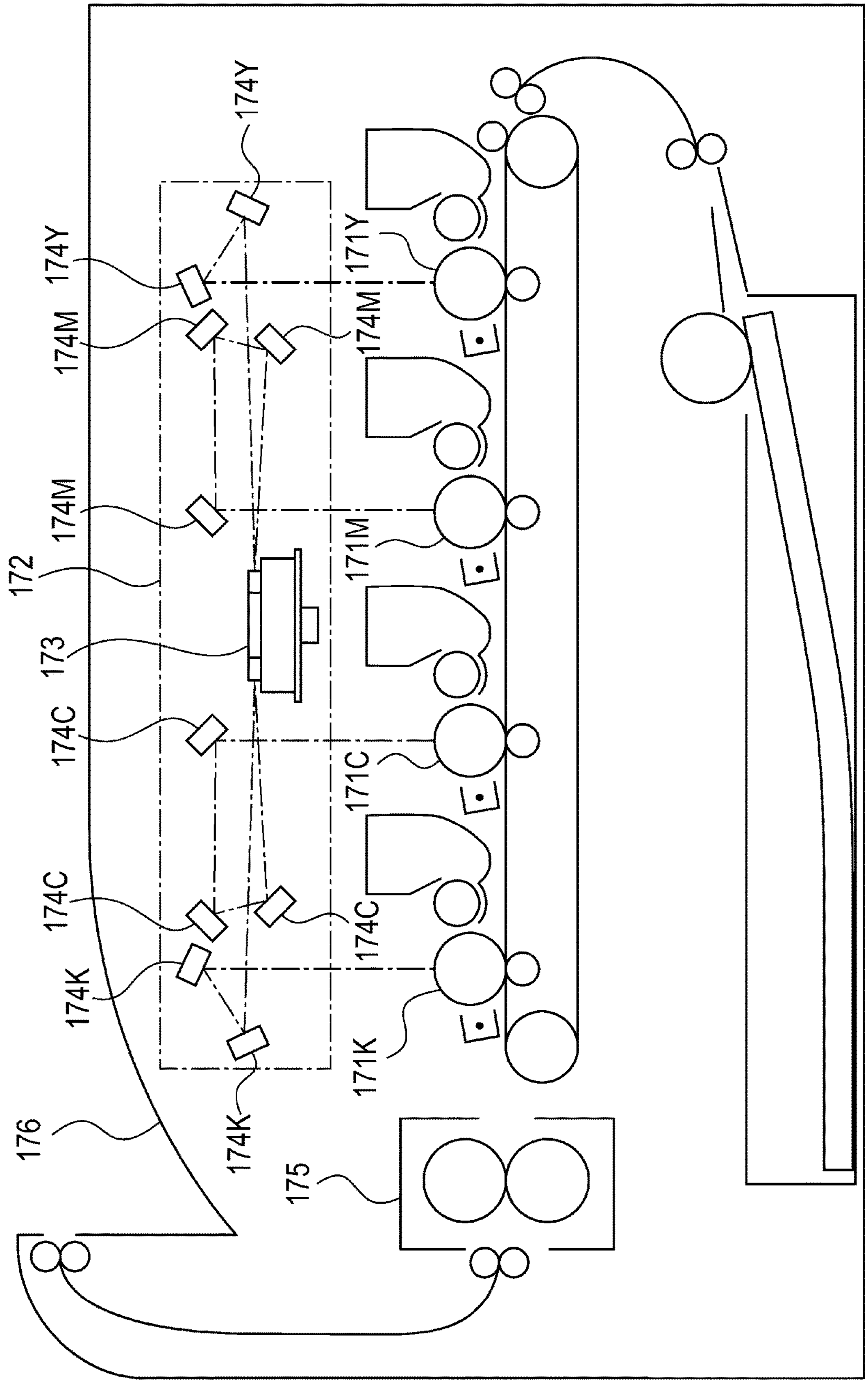
FIG. 7 is a sectional view for illustrating a conventional image forming apparatus.
Figure 8:
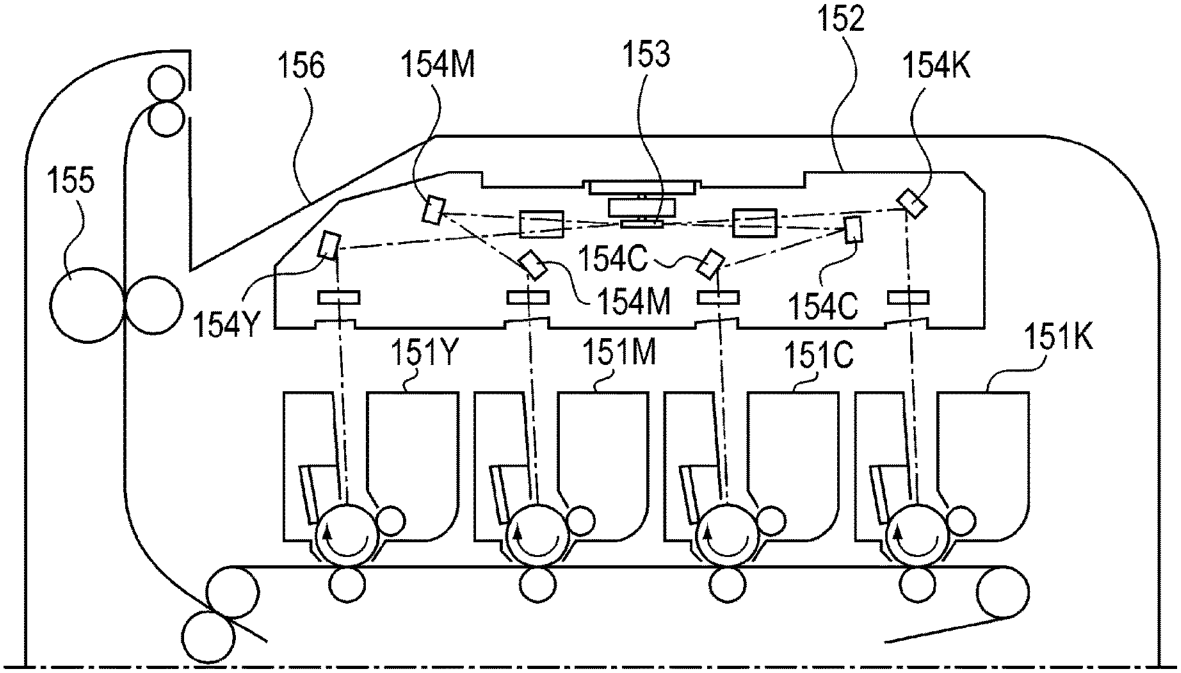
FIG. 8 is a sectional view for illustrating a conventional image forming apparatus.

Further, the stacking tray 50 has the inclined surface 51 just above a rotation center of the photosensitive drum 11a closest to the fixing device 30. The stacking tray 50 has the flat surface 52 just above a rotation center of the photosensitive drum 11d remotest from the fixing device 30. As shown in FIG. 4, a crossing portion 53 where the inclined surface 51 and the flat surface 52 of the stacking tray 50 cross each other is positioned, with respect to the horizontal direction, between rotation centers of the two photosensitive drums 11b and 11c close to the polygonal mirror 4 (rotatable polygonal mirror). In FIG. 4, a vertical line from the rotation center of one photosensitive drum 11b close to the polygonal mirror 4 is represented by X2, a vertical line from the rotation center of the other photosensitive drum 11c close to the polygonal mirror 4 is represented by X3. The crossing portion 53 where the inclined surface 51 and the flat surface 52 of the stacking tray 50 cross each other is positioned between the vertical line X2 and the vertical line X3.

A relationship in height with respect to a vertical direction between a recording material stacking surface of the stacking tray 50 and a discharge opening 43 through which the recording material is to be discharged onto the stacking tray 50 as follows. The stacking tray 50 includes, as the recording material stacking surface, the inclined surface 51 and the flat surface 52. As shown in FIG. 4, a first point of intersection between the vertical line X2 passing through the rotation center of the photosensitive drum 11a closest to the fixing device 30 and the stacking tray 50 (inclined surface 51) is a first position 51a. A second point of intersection between the vertical line X3 passing through the rotation center of the photosensitive drum 11d remotest from the fixing device 30 and the stacking tray 50 (flat surface 52) is a second position 52a. A shape of the stacking tray 50 is such that a relationship in height among the discharge opening 43, the first position 51a of the stacking tray 50 and the second position 52a of the stacking tray 50 satisfy: (first position 51a of stacking tray 50)<(discharge opening 43)<(second position 52a of stacking tray 50).

Further, light beams L1, L2, L3 and L4 emitted from the optical scanning apparatus 2 and incident on the photosensitive drums 11a, 11b, 11c and 11d are obliquely incident on the respective photosensitive drums from a side opposite from the fixing device 30 side with respect to a vertical direction of the image forming apparatus. As a result, compared with the case where the light beams are caused to be incident on the photosensitive drums in the vertical direction, the optical scanning apparatus 2 can be disposed on the front side of the image forming apparatus, so that it is possible to avoid interference between the rear-side upper portion 13 of the optical scanning apparatus 2 and the inclined surface 51 of the stacking tray 50, and thus the height of the image forming apparatus can be suppressed to a low level. In this embodiment, the light beams are caused to be incident on the photosensitive drums by being inclined relative to vertical lines X1, X2, X3 and X4 by 10°.

Figure 3:
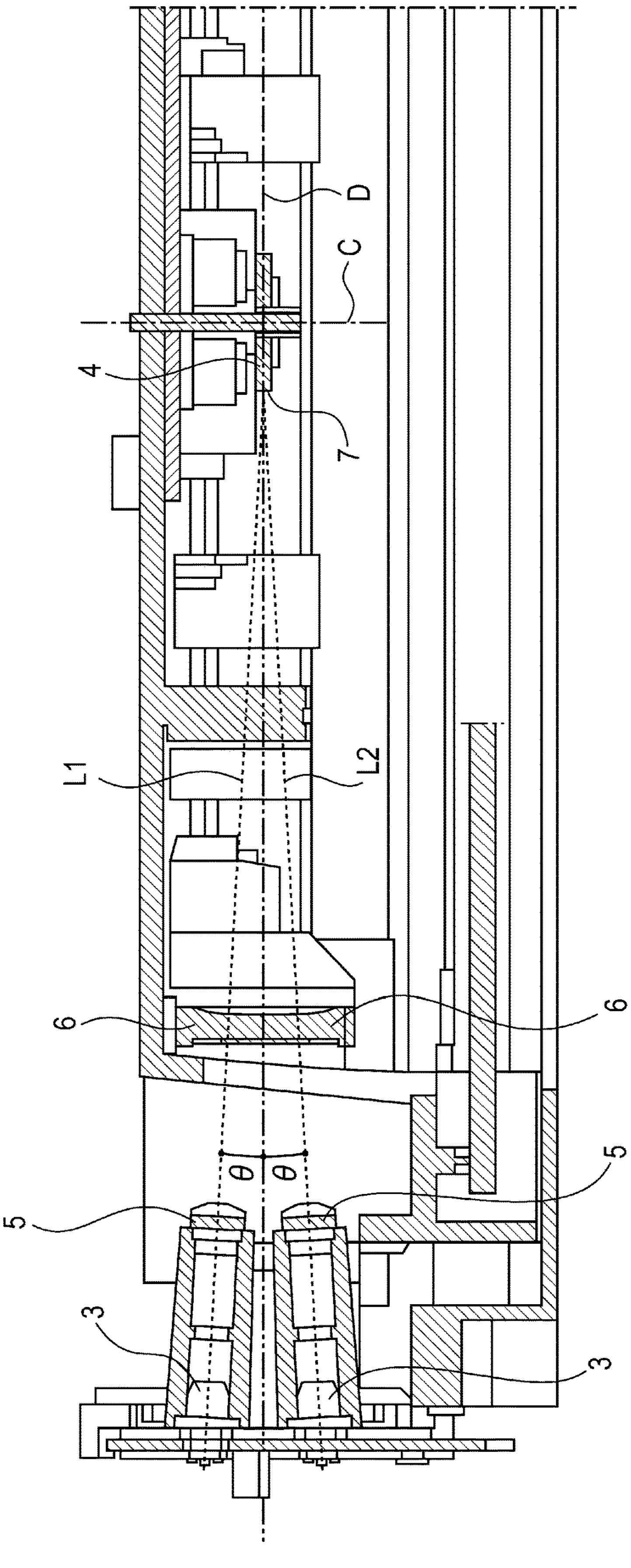
FIG. 3 is a sectional view of an incident optical system toward a polygonal mirror of the optical scanning apparatus according to the embodiment 1.

Next, the optical scanning apparatus 2 will be described with reference to FIGS. 2 and 3. FIG. 2 is a sectional view of the optical scanning apparatus 2 in this embodiment, and is the sectional view of an optical scanning system in which the light beams deflected by the polygonal mirror are guided to the photosensitive drums. FIG. 3 is a sectional view of an incident optical system on the polygonal mirror of the optical scanning apparatus.

The optical scanning apparatus 2 according to this embodiment is, as shown in FIG. 2, an optical scanning portion for scanning the plurality of photosensitive drums with the light beams, emitted from the plurality of light sources, through optical members by the polygonal mirror 4 which is the rotatable polygonal mirror includes in the deflector. In the optical scanning apparatus 2 shown in FIG. 2, the optical members illustrated are first imaging lenses 8 which are first imaging members, second imaging lenses 9 which are second imaging members, and reflection mirrors 10*a*, 10*b*, 10*c*, 10*d*, 10*e* and 10*f* which are reflecting members. The deflector includes the polygonal mirror 4 which is the rotatable polygonal mirror. The optical scanning apparatus 2 includes the deflector including the polygonal mirror 4, the imaging lenses 8 and 9, the reflection mirrors 10*a*-10*f*, and a frame 2*a* to which these members are mounted. The deflector including the polygonal mirror 4 is mounted on the frame 2*a* on an upper surface side. In the optical scanning apparatus 2, these optical members are disposed in a bilaterally asymmetrical manner between a scanning region A1 and a scanning region A2 with respect to the polygonal mirror 4. Here, the scanning region A1 is a first region on the fixing device 30 side (image heating portion side) and is a region in which the light beams L1 and 12 incident on the photosensitive drums 11*a* and 11*b* pass. The scanning region A2 is a second region on an opposite side (opposite image heating portion side) from the fixing device 30 side and is a region in which the light beams L3 and L4 incident on the photosensitive drums 11*c* and 11*d* pass. The optical scanning apparatus 2 deflects the light beams L1, L2, L3 and L4 emitted from the plurality of light sources in a division manner into the scanning region A1 on the fixing device 30 side and the scanning region A2 on the opposite side from the fixing device 30 by the polygonal mirror 4. Of the reflecting members of the optical scanning apparatus 2, the reflection mirror 10*c* is a first reflecting member disposed at a position remotest from the polygonal mirror 4 in the scanning region A1 which is the first region and reflecting, toward the photosensitive drum 11*a*, the light beam L1 reflected toward the scanning region A1. Further, the reflection mirror 10*f* is a second reflecting member disposed at a position remotest from the polygonal mirror 4 in the scanning region A2 which is the second region and reflecting, toward the photosensitive drum 11*d*, the light beam L4 reflected toward the scanning region A2.

The optical scanning apparatus 2 is disposed such that an axis of the polygonal mirror 4 is inclined relative to the vertical direction so that the image heating portion side is lower than the opposite image heating portion side with respect to a horizontal line (rectilinear line Y). Here, in the image forming apparatus 100 of this embodiment, a horizontal direction refers to a direction of the rectilinear line Y connecting rotation centers of the remotest two develops 11*a* and 11*d* of the four photosensitive drums. Further, the deflector including the polygonal mirror 4 is disposed at a position close to the photosensitive drum 11*c* relative to an intermediary point CH between the two photosensitive drums 11*b* and 11*c*. That is, the deflector is disposed at the position, with respect to the horizontal direction, closer to the photosensitive drum 11*b* disposed on the opposite image heating portion side than to the photosensitive drum 11*b* disposed on the image heating portion side, in which the two photosensitive drums 11*b* and 11*c* are disposed while sandwiching the deflector therebetween and are closest to the deflector. Thus, the polygonal mirror 4 is inclined relative to the horizontal direction, whereby the optical scanning apparatus 2 can be disposed obliquely relative to the horizontal direction in the image forming apparatus. Further, in the horizontal direction, the position of the polygonal mirror 4 is brought nearer to the photosensitive drum 11*c* than to the photosensitive drum 11*b*, so that even when the polygonal mirror 4 is inclined from the horizontal direction, lengths of the light beams L1, L2, L3 and L4 can be kept at the same length. Incidentally, the intermediary point CH is also an intermediary point between the rotation centers of the photosensitive drums 11*a* and 11*d*. Accordingly, a vertical line XC passing through the intermediary point CH shown in FIG. 2 is a vertical line equidistant from the vertical line X1 passing through the rotation center of the photosensitive drum 11*a* and a vertical line X4 passing through the rotation center of the photosensitive drum 11*b*. With respect to this vertical line XC, the vertical line X1 side is the image heating portion side, and the vertical line X4 side is the opposite image heating portion side which is a side opposite from the image heating portion side.

In this embodiment, a so-called an oblique incident optical system is employed. The oblique incident optical system is, as shown in FIG. 3, an optical system such that the light beams L1 and L2 are caused to be obliquely incident on a plane D perpendicular to a rotational axis C of the polygonal mirror 4. Incident optical systems each consisting of a light source portion 3 which is a light source, a collimator lens 5 and a cylindrical lens 6 are vertically arranged with respect to the plane D perpendicular to the rotational axis C, and the light beams are caused to be incident on the reflecting surface 7 of the polygonal mirror 4 with desired angles θ with respect to the plane D perpendicular to the reflecting surface 7, so that these incident optical systems are symmetrical with respect to the plane D. Of the plurality of light sources shown in FIG. 2, the light source portion 3 on a side above the plane D is a first light source provided being inclined with respect to the plane D by the desired angle θ. The light beam L1 emitted from the upper-side light source portion 3 is incident on the reflecting surface 7 of the polygonal mirror 4 from an obliquely upper side in the angle θ. The light beam L1 emitted, by the upper-side light source portion 3, from the obliquely upper side with respect to the plane D toward the reflecting surface 7 of the polygonal mirror 4 is reflected by the reflecting surface 7 of the polygonal mirror 4 toward the scanning region A1 shown in FIG. 2 and toward an obliquely lower side with respect to the plane D. On the other hand, the light source portion 3 on a side below the plane D is a second light source provided being inclined with respect to the plane D by the desired angle θ. The light beam L2 emitted from the lower-side light source portion 3 is incident on the reflecting surface 7 of the polygonal mirror 4 from an obliquely lower side in the angle θ. The light beam L2 emitted, by the lower-side light source portion 3, from the obliquely lower side with respect to the plane D toward the reflecting surface 7 of the polygonal mirror 4 is reflected by the reflecting surface 7 of the polygonal mirror 4 toward the scanning region A1 shown in FIG. 2 and toward an obliquely upper side with respect to the plane D. Thus, the light beams L1 and L2 from the upper and lower (two) light source portions 3 are caused to be incident on the reflecting surface 7 from obliquely upper and lower sides, respectively, so that the light beams L1 and L2 are separable in upper and lower optical paths after being reflected by the polygonal mirror 4.

Incidentally, although not illustrated in FIG. 3, the incident optical system including the light sources for emitting the light beams L3 and L4 also employs a similar constitution. That is, the light beams L3 and L4 from the upper and lower (two) light sources 3 are caused to be incident on the reflecting surface 7 from the obliquely upper and lower sides, respectively, so that the light beams L3 and L4 are separable in upper and lower optical paths after being reflected by the polygonal mirror 4. The light beam L3 emitted by the upper side light source portion 3 toward the reflecting surface 7 of the polygonal mirror 4 from the obliquely upper side relative to the plane D is reflected by the reflecting surface 7 of the polygonal mirror 4 toward the scanning region A2 shown in FIG. 2 and toward the obliquely lower side relative to the plane D. The light beam L4 emitted by the lower-side light source portion 3 toward the reflecting surface 7 of the polygonal mirror 4 from the obliquely lower side relative to the plane D is reflected by the reflecting surface 7 of the polygonal mirror 4 toward the scanning region A2 shown in FIG. 2 and toward the obliquely upper side relative to the plane D.

Next, referring to FIG. 2 again, the optical scanning apparatus 2 in this embodiment will be described. The light beams L1 and L2 allocated to the scanning region A1 which is the first region and the light beams L3 and L4 allocated to the scanning region A2 which is the second region will be described in a named order.

The light beams incident on the reflecting surface 7 of the polygonal mirror 4 are reflected with the angle θ relative to the plane D perpendicular to the rotational axis C of the polygonal mirror 4.

First, on the scanning region A1 side, the two light beams L1 and L2 reflected by the reflecting surface 7 are incident on a first imaging lens 8 which is a first imaging member common to the light beams L1 and L2.

Of the light beams coming out of the first imaging lens 8, the outgoing light beam L2 toward the obliquely upper side relative to the plane D perpendicular to the rotational axis C is reflected by a first reflection mirror 10*a*. Thereafter, the light beam L2 is reflected again by a second reflection mirror 10*b* and passes through a second imaging lens 9 and then reaches the photosensitive drum 11*b*.

Of the light beams coming out of the first imaging lens 8, the outgoing light beam L1 toward the obliquely lower side relative to the plane D perpendicular to the rotational axis C passes blow the first reflection mirror 10*a* and is reflected by a third reflection mirror 10*c*, and thereafter passes through a second imaging lens 9 and then reaches the photosensitive drum 11*a*. Here, the third reflection mirror 10*c* of the reflecting members of the optical scanning apparatus 2 is a first reflecting member which is disposed at a position remotest from the polygonal mirror 4 in the scanning region A1 being the first region and which reflects the light beam L1 toward the photosensitive drum 11*a*. The light beam L1 reflected by the reflecting surface 7 of the polygonal mirror 4 toward the scanning region A1 and the obliquely lower side relative to the plane D as described above, and thereafter is reflected only by the above-described reflection mirror 10*c* which is the first reflecting member until the light beam L1 reaches the photosensitive drum 11*a*.

The first imaging lens 8 is shared between the light beams L1 and L2, and the second imaging lens 9 is provided for each of the light beams L1 and L2.

On the other hand, on the scanning region A2 side, the two light beams L3 and L4 reflected by the reflecting surface 7 are incident on a first imaging lens 8 which is a first imaging member common to the light beams L3 and L4.

Of the light beams coming out of the first imaging lens 8, the outgoing light beam L3 toward the obliquely lower side relative to the plane D perpendicular to the rotational axis C is reflected by a fourth reflection mirror 10*d*. Thereafter, the light beam L3 is reflected again by a fifth reflection mirror 10*e* and passes through a second imaging lens 9 and then reaches the photosensitive drum 11*c*.

Of the light beams coming out of the first imaging lens 8, the outgoing light beam L4 toward the obliquely upper side relative to the plane D perpendicular to the rotational axis C passes above the fourth reflection mirror 10*d* and is reflected by a sixth reflection mirror 10*f*, and thereafter passes through a second imaging lens 9 and then reaches the photosensitive drum 11*d*. Here, the sixth reflection mirror 10*f* of the reflecting members of the optical scanning apparatus 2 is a second reflecting member which is disposed at a position remotest from the polygonal mirror 4 in the scanning region A2 being the first region and which reflects the light beam L4 toward the photosensitive drum 11*d*. The light beam L4 reflected by the reflecting surface 7 of the polygonal mirror 4 toward the scanning region A2 and the obliquely upper side relative to the plane D as described above, and thereafter is reflected only by the above-described reflection mirror 10*f* which is the first reflecting member until the light beam L4 reaches the photosensitive drum 11*d*.

Similarly as the scanning region A1, also on the scanning region A2 side, the first imaging lens 8 is shared between the light beams L3 and L4, and the second imaging lens 9 is provided for each of the light beams L3 and L4.

On the scanning region A1 side, as described above, the upper light beam L2 relative to the plane D perpendicular to the rotational axis C is separated from the lower light beam L1 with use of the reflection mirror 10*a*, and is guided to the photosensitive drum 11*b* on the polygonal mirror 4 side. Further, the lower light beam L1 relative to the plane D perpendicular to the rotational axis C is guided to the photosensitive drum 11*a* on the image heating portion side with use of the reflection mirror 10*c* which is the first reflecting member. The reflection mirror 10*c* which is the first reflecting member is disposed at the position (on the image heating portion side in this embodiment) remotest from the polygonal mirror 4 as described above. Thus, the upper light beam L2 is separated using the reflection mirror at the position close to the polygonal mirror 4 on the scanning region A1 side which is the image heating portion side. As a result, a narrow space between the process cartridge PY and a lower portion, on the opposite image heating portion side, of the stacking tray 50 including the inclined surface 51 such that the image heating portion side is lower than the opposite image heating portion side can be effectively utilized. Incidentally, a range of a portion under the stacking tray 50 on the image heating portion side is an overlapping range, with respect to the vertical direction, between the scanning region A1 of the optical scanning apparatus 2 on the image heating portion side and a region on the vertical line X1 side (image heating portion side) with respect to the vertical line XC.

On the other and, on the scanning region A2 side, contrary to the above case, the lower light beam L3 relative to the plane D perpendicular to the rotational axis C is separated from the upper light beam L3 with use of the reflection mirror 10*d*, and is guided to the photosensitive drum 11*b* on the polygonal mirror 4 side. Further, the upper light beam L4 relative to the plane D perpendicular to the rotational axis C is guided to the photosensitive drum 11*d* on the opposite image heating portion side with use of the reflection mirror 10*f* which is the second reflecting member. The reflection mirror 10*f* which is the second reflecting member is disposed at the position (on the opposite image heating portion side in this embodiment) remotest from the polygonal mirror 4 as described above. Thus, the lower light beam L3 is separated using the reflection mirror 10*d* at the position close to the polygonal mirror 4 on the scanning region A2 side which is the opposite image heating portion side. As a result, a space above the process cartridge Pk on the forefront side (opposite image heating portion side) can be broadly ensured.

Further, as described above, the optical scanning apparatus 2 is disposed such that the axis of the polygonal mirror 4 is inclined relative to the vertical direction so that the image heating portion side is lower than the opposite image heating portion side. Further, in the optical scanning apparatus 2, the light beam L1 reflected by the reflecting surface 7 of the polygonal mirror 4 toward the scanning region A1 shown in FIG. 2 and toward the obliquely lower side relative to the plane D is reflected toward the photosensitive drum 11*a* by the reflection mirror 10*c*. Further, in the optical scanning apparatus 2, the light beam L4 reflected by the reflecting surface 7 of the polygonal mirror 4 toward the scanning region A2 shown in FIG. 2 and toward the obliquely upper side relative to the plane D is reflected toward the photosensitive drum 11*d* by the reflection mirror 10*d*. By this constitution, the optical scanning apparatus 2 is capable of being changed to various shapes with no bilateral symmetry with respect to the axis of the polygonal mirror 4, so that the shape of the optical scanning apparatus 2 can be formed depending on an outer casing of the image forming apparatus. As a result, the space inside the image forming apparatus can be effectively utilized.

Further, by employing the above-described arrangement constitution of the reflecting members of the optical scanning apparatus 2, a distance between an emergent opening remotest from the fixing device 30 and the photosensitive drum corresponding to the emergent opening is longer than distances each between another emergent opening and an associated photosensitive drum. A relationship of these distances is shown in FIG. 4. FIG. 4 is a schematic sectional view of the optical scanning apparatus 2 in this embodiment. As shown in FIG. 4, the distance between an emergent opening 14*d* remotest from the fixing device 30 and the photosensitive drum 11*d* corresponding to the emergent opening 14*d* is longer than the distance between other emergent openings 14*a*, 14*b* and 14*c* and the photosensitive drums 11*a*, 11*b* and 11*c*, respectively. Specifically, a distance Ld between the emergent opening 14*d* remotest from the fixing device 30 and the photosensitive drum 11*d* corresponding to the remotest emergent opening 14*d* is longer than a distance La between the emergent opening 14*a* closest to the fixing device 30 and the photosensitive drum 11*a* corresponding to the closest emergent opening 14*a*. Incidentally, a relationship among distances La, Lb, Lc and Ld between the emergent openings 14*a*, 14*b*, 14*c* and 14*d* and the corresponding photosensitive drums 11*a*, 11*b*, 11*c* and 11*d*, respectively, is La=Lb=Lc<Ld. Further, a distance ha from the rotation center of the photosensitive drum 11*a*, closest to the fixing device 30, to the stacking tray 50 (inclined surface 51) with respect to the vertical direction is shorter than a distance hd from the rotation center of the photosensitive drum 11*d*, remotest from the fixing device 30, to the stacking tray 50 (flat surface 52) with respect to the vertical direction. As a result, a space between a lower portion of the stacking tray 50 on the image heating portion side and the process cartridge PY disposed on the image heating portion side closest to the fixing device 30 can be effectively utilized. At the same time, a space above the process cartridge PK on the forefront side (opposite image heating portion side) can be broadly ensured.

According to this embodiment, the space between the lower portion of the stacking tray on the image heating portion side and the process cartridge disposed on the image heating portion side closest to the fixing device can be utilized effectively. At the same time, also the space above the process cartridge (the black process cartridge increased in volume in this embodiment) disposed on the opposite image heating portion side remotest from the fixing device can be utilized effectively. As a result, it is possible to realize an image forming apparatus in which the inside space is effectively utilized.

Other Embodiments

In the above-described embodiment, as a constitution in which the photosensitive member is scanned with the light beam, deflected by the deflector, through the optical members, a constitution in which the photosensitive member is scanned with the light beam through the two imaging lenses was described as an example, but the present invention is not limited thereto, and a single imaging lens or three or more imaging lenses may also be used. Further, a constitution of a single reflection mirror or two reflection mirrors was also described as an example, but the present invention is not limited thereto, and may only be required to be appropriately set.

In the above-described embodiment, the case where the relationship of the distances La, Lb, Lc and Ld between the emergent openings 14*a*, 14*b*, 14*c* and 14*d* of the optical scanning apparatus 2 and the corresponding photosensitive drums 11*a*, 11*b*, 11*c* and 11*d* is La=Lb=Lc<Ld was described as an example. However, the relationship of the distances La, Lb, Lc and Ld is not limited thereto. Of the distances La, Lb and Lc and Ld, compared with the distances La and Lb, the distances Lc and Ld may be long, and the distances Lc and Ld may also be equal to each other. Also by this constitution, similarly as in the above-described embodiment, the space between the lower portion of the stacking tray on the image heating portion side and the process cartridge disposed on the image heating portion side can be effectively utilized. At the same time, the space above the process cartridge disposed on the opposite image heating portion side can be broadly ensured.

In the above-described embodiment, the four process cartridges were used, but the number of the process cartridges used is not limited thereto, and may only be required to be appropriately set as desired.

Further, in the above-described embodiment, the constitution in which the process cartridges are supported so as to be mountable in and dismountable from the supporting member pulled out from the rear side toward the front side of the image forming apparatus was described as an example, but the present invention is not limited thereto. A constitution in which the process cartridges are directly mounted in and dismounted from the image forming apparatus may also be employed.

Further, in the above-described embodiment, the constitution in which the process cartridge including the photosensitive member, the process means and the cartridge accommodating the toner is mountable in and dismountable from the image forming apparatus was described as an example, but the present invention is not limited thereto. For example, an image forming apparatus in which respective constituent elements, constituting a cartridge, such as the photosensitive member, the process means and the toner cartridge are mountable in and dismountable from the image forming apparatus may also be employed.

Further, in the above-described embodiment, as the image forming apparatus, the printer was described as an example, but the present invention is not limited thereto. For example, other image forming apparatuses such as a copying machine, a facsimile apparatus or other image forming apparatuses such as a multi-function machine having functions of these machines in combination may also be used. Further, the present invention is not limited to the image forming apparatus in which the intermediary transfer belt which is the intermediary transfer member is used and the toner images of the respective colors are successively transferred superposedly onto the intermediary transfer member and then are collectively transferred onto the recording material. For example, an image forming apparatus in which a recording material carrying member is used and the toner images of the respective colors are successively transferred superposedly onto a recording material carried on the recording material carrying member may also be used. By applying the present invention to these image forming apparatuses, a similar effect can be obtained.

Further, in the above-described embodiment, the horizontal direction is the direction of the rectilinear line Y connecting the rotation centers of the photosensitive drums 11*a* and 11*d*, of the four photosensitive drums, remotest from each other, but the present invention may also be applied to an image forming apparatus in which the horizontal direction and the rectilinear line Y are non-parallel with each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-186516 filed on Oct. 1, 2018, which is hereby incorporated by reference herein in its entirety.

What is claimed is:

1. An image forming apparatus comprising:

a plurality of photosensitive members;

a scanner unit configured to scan said photosensitive members with laser beams in accordance with image information, wherein said scanner unit includes light sources corresponding to said photosensitive members, respectively, a rotatable polygonal mirror configured to reflect and deflect the laser beams emitted from said light sources, a frame configured to support said rotatable polygonal mirror, a plurality of reflecting members configured to reflect the laser beams, respectively, reflected by said rotatable polygonal mirror, and a cover configured to cover an opening of said frame, wherein said cover is provided with passing portions through which the laser beams pass to an exterior of the scanner unit; and a fixing device configured to fix, on a recording material, toner images formed on said photosensitive members and then superposed on the recording material, wherein with respect to a vertical direction, said scanner unit is located above said photosensitive members, wherein selected ones of the laser beams emitted from said light sources are reflected by said rotatable polygonal mirror toward a side where said fixing device is provided, and remaining ones of the laser beams are reflected by said rotatable polygonal mirror toward a side opposite from the side where said fixing device is provided, wherein of the selected ones of the laser beams reflected by said rotatable polygonal mirror toward the side where said fixing device is provided, and with respect to a first reflecting member provided at a position remotest from said rotatable polygonal mirror toward the side where said fixing device is provided among said plurality of reflecting members, the laser beam reflected toward the first reflecting member travels downward relative to an imaginary line connecting rotational axes of said photosensitive members as seen in a rotational axis direction of one of said photosensitive members, wherein of the remaining ones of the light beams, and with respect to a second reflecting member provided at a position remotest from said rotatable polygonal mirror toward the side opposite from the side where said fixing device is provided among said plurality of reflecting members, the light beam reflected toward the second reflecting member travels upward relative to the imaginary line as seen in the rotational axis direction, wherein a rotational axis of said rotatable polygonal mirror is supported by said frame at a supporting portion of said frame, wherein with respect to the vertical direction, said cover is located between said supporting portion of said frame and said plurality of photosensitive members, wherein with respect to the vertical direction, said supporting portion of said frame, said rotatable polygonal mirror, said cover, and said plurality of photosensitive members are arranged in this order, and wherein an optical path length from said rotatable polygonal mirror to said first reflecting member is longer than an optical path length from said rotatable polygonal mirror to said second reflecting member.

2. An image forming apparatus according to claim 1, further comprising a discharge tray having an inclined surface for receiving the recording material on which an image is formed and which is discharged from an inside of said image forming apparatus, wherein said scanner unit overlaps with said inclined surface as seen in the vertical direction.

3. An image forming apparatus according to claim 1, wherein optical path lengths from said rotatable polygonal mirror to respective photosensitive members are equal to each other.

* * * * *